United States Patent [19]

Fenter

[11] 4,400,767
[45] Aug. 23, 1983

[54] SELF START FLYBACK POWER SUPPLY

[75] Inventor: William S. Fenter, Marlboro, Mass.

[73] Assignee: Honeywell Information Systems Inc., Waltham, Mass.

[21] Appl. No.: 279,108

[22] Filed: Jun. 30, 1981

[51] Int. Cl.³ .............................................. H02P 13/22
[52] U.S. Cl. ...................................... 363/21; 363/37; 363/49
[58] Field of Search .................................. 363/19-21, 363/30, 34, 49, 37, 97, 131

[56] References Cited

U.S. PATENT DOCUMENTS

| | | | |
|---|---|---|---|
| 3,487,234 | 12/1969 | Morgan | 363/131 |
| 4,121,282 | 10/1978 | Ohsawa | 363/21 |
| 4,236,198 | 11/1980 | Ohsawa et al. | 363/21 |
| 4,246,634 | 1/1981 | Purol | 363/49 |
| 4,302,803 | 11/1981 | Shelly | 363/20 |
| 4,353,112 | 10/1982 | Rietveld et al. | 363/97 |

FOREIGN PATENT DOCUMENTS

| | | | |
|---|---|---|---|
| 2638225 | 3/1978 | Fed. Rep. of Germany | 363/49 |
| 2909695 | 9/1980 | Fed. Rep. of Germany | 363/21 |

OTHER PUBLICATIONS

Moorman, "Transistor Switching Regulator Start Circuit," IBM Technical Disclosure Bulletin, vol. 13, No. 9, pp. 2763, 2764, Feb. 1971.

*Primary Examiner*—William H. Beha, Jr.
*Attorney, Agent, or Firm*—Faith F. Driscoll; Nicholas Prasinos

[57] ABSTRACT

A switching regulator power supply operates at a variable high frequency with low power dissipation and a minimum of complexity. The transformer primary windings are included as part of a self starting circuit which starts a pulse generator having a fixed pulse width and variable frequency. During a first cycle of operation, the self starting circuit in response to the input rectified AC power after a predetermined period of time applies sufficient voltage which enables the pulse generator to begin generating a first output pulse of fixed pulse width. This causes the primary windings to store energy and feedback energy to the self starting circuit which increases the voltage applied to the generator causing it to begin normal operation at maximum frequency. An error circuit coupled to the secondary winding compares the output DC supply voltage to a reference voltage and generates an error signal which is applied through a DC coupling circuit for adjusting the frequency of the pulse generator to existing line and load conditions.

38 Claims, 15 Drawing Figures

SCALE:
50V/div.
2 ms/div.

Fig. 3A.

SCALE:
5V/div.
2 ms/div.

Fig. 3B.

SCALE:
5V/div.
2 ms/div.

Fig. 3C.

SCALE:
2V/div.
2ms/div.

Fig. 3D.

SCALE:
50V/div.
2ms/div.

Fig. 3E.

SCALE:
5V/div.
2ms/div.

Fig. 3F.

SCALE:
5V/div.
2ms/div.

Fig. 3G.

SCALE:
2V/div.
2ms/div.

Fig. 3H.

SCALE:
2V/div.
5ms/div.

SELF START FLYBACK POWER SUPPLY

BACKGROUND OF THE INVENTION

1. Field of Use

The present invention relates to apparatus for converting AC voltages to relatively low level DC voltages and more particularly to switching regulator power supply apparatus. 2. Prior Art In general, computer equipment and associated peripheral equipment include their own internal power supplies. Such supplies are used to convert AC line voltages having the voltage ranges of 95-132 volts and frequencies of 50-60 Hertz into required DC voltages of 5-24 volts. In operation, these supplies generally rectify the AC line voltages which are applied to the primary windings of a step down transformer. The voltages induced in the secondary windings of the transformer are filtered and averaged to obtain the desired values of DC voltages.

As computer equipment and peripheral equipment become more compact and smaller in size, it becomes necessary to reduce the size weight and power requirements of the internal power supplies utilized therein. One approach has been to reduce the complexity of the high frequency switching circuitry associated with primary windings of the transformer. Examples of this approach are illustrated in U.S. Pat. Nos. 3,924,172, 4,055,790 and 4,128,867.

While the arrangements described in the above patents reduce the circuit complexity in this part of the power supply, the arrangements normally require additional circuitry which include separate line frequency transformers which power the control pulse circuits connected between the primary and secondary transformer windings. These arrangements may also include feedback circuits which couple to the line frequency transformer or bias transformer and circuits for providing power to operate the control circuitry during power supply operation.

Another approach is to employ a transformer flyback arrangement which utilizes a clock circuit which couples to the AC line power circuits through voltage doubling circuits. The clock circuit operates to generate a variable width pulse at a fixed frequency which is applied to power switching circuits which couple to the primary winding of the transformer. During the time interval defined by the width of the clock circuit pulse, the power switching circuits deliver power to the primary windings. At the end of the interval, the power switching circuits turn off causing current flow in the opposite direction through primary winding (transformer flyback). This induces a voltage in the secondary windings of a polarity which permits the transfer of energy to a load. At the end of this transfer cycle which occurs during transformer flyback defined by the fixed frequency of the clock circuit, another energy storage cycle is initiated. An amplitude pulse width converter compares the voltage output of the power supply with predetermined value and a feedback circuit DC couples signals from the converter for shortening the duration of the energy storage cycle. An example of this type of arrangement is described in U.S. Pat. No. 4,001,663.

The above type of arrangement has been found to be quite complex due to the additional circuits required for furnishing power to the clock circuit and controlling the pulse width. More importantly, it has been found that such an arrangement cannot be easily controlled so as to minimize power supply consumption.

Accordingly, it is a primary object of the present invention to provide a light weight, compact and efficient power supply.

It is a further object of this invention to provide a switching regulator power supply which minimizes power consumption.

It is still a further object of the present invention to provide a switching regulator power supply which is easily constructed in integrated circuit form.

SUMMARY OF THE INVENTION

The above objects are achieved in a preferred embodiment of the switching regulator power supply of the present invention which includes a self starting circuit for a pulse generator circuit which generates fixed width pulses at a variable frequency rate.

The self starting circuit includes the primary windings of the transformer to which the rectified AC power is applied, a switching power circuit and an RC controlled voltage regulator circuit. The RC controlled voltage regulator circuit in response to the rectified AC power operates to apply an output signal after a predetermined period of time for starting pulse generator circuit operation.

The output voltage generated by the generator circuit switches on the power circuit causing current to flow through one of the transformer primary windings and a portion feedback through another feedback primary winding to the RC controlled voltage regulator circuit causing it to condition the pulse generator circuit to operate within its normal range. At the end of each fixed width pulse, the power circuit switches off preventing further current flow within the transformer primary windings. This causes current to flow in the opposite direction which produces a voltage in the secondary windings of the transformer so polarized so as to transfer energy to the loads connected thereto.

The preferred embodiment further includes a voltage to frequency converter circuit which monitors the secondary power supply voltage and generates a voltage error signal which is DC coupled through an optical coupler circuit included therein for controlling the frequency of the pulse generator circuit. When the error signal indicates that the secondary voltage is higher than a reference voltage, the optical coupler circuit is switched on which inhibits the pulse generator circuit from generating further pulses. This is done by holding the generator trigger voltage above the normal voltage threshold thereby preventing the generation of further output pulses.

By controlling the rate at which the pulse generator circuit generates fixed width pulses in turn establishes the number of energy storage cycles required for maintaining desired values of power supply voltages as a function of load conditions. When little or no power is being dissipated by the load, the error circuit generates an error signal turning on the optical coupler circuit which decreases the operating frequency to a minimum. This, in turn, minimizes the power requirements of the power supply circuits and maximizes efficiency. Utilizing optical coupling in lieu of transformer coupling for controlling the turn on of the pulse generator circuit further reduces circuit complexity.

In accordance with the teachings of the present invention, the RC controlled voltage regulator circuit has an input series RC network whose time constant establishes the desired turn-on time for the pulse generator circuit. The voltage regulator circuit of the preferred embodiment minimizes power during power supply operation. Also, the regulator circuit, pulse generator and error circuit can be constructed from standard integrated circuits which further adds to the compactness of the power supply.

The novel features which are believed to be characteristic of the invention both as to its organization and method of operation, together with further objects and advantages will be better understood from the following description when considered in connection with the accompanying drawings. It is to be expressly understood, however, that each of the drawings are given for the purpose of illustration and description only and are not intended as a definition of the limits of the present invention.

DESCRIPTION OF THE PREFERRED EMBODIMENT

Figure 1:
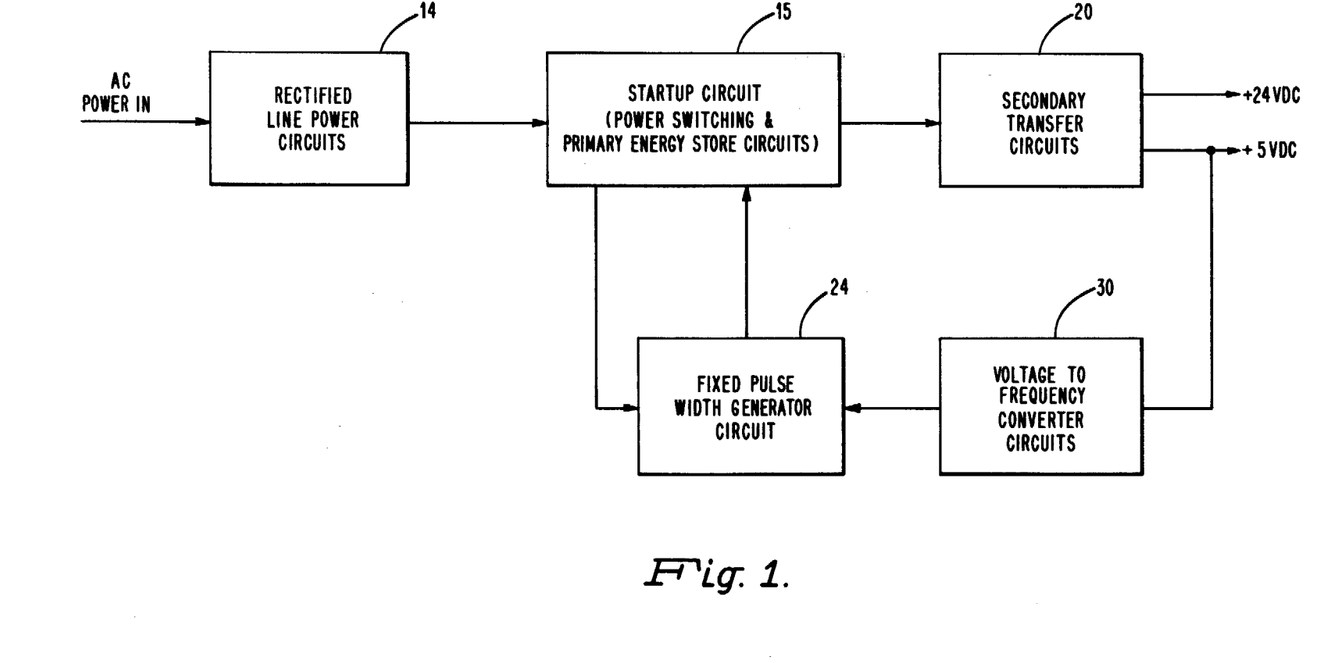
FIG. 1 is a block diagram of the regulated power supply of the present invention.

FIG. 1 illustrates in block diagram form, the preferred embodiment of the switching regulator power supply of the present invention. As shown, AC power is applied to the circuits of block 14. The output AC rectified power is applied to the start-up circuit of block 15. This circuit which includes the power switching and primary energy storage circuits applies an initial output voltage to the fixed pulse width generator circuit of block 24 sufficient to start it operating. The generator circuit 24 generates an output voltage which enable the primary energy storage circuits to store energy and feed energy back to the start-up circuit which produces an output voltage sufficient for normal operation of the generator circuit 24.

At the end of each pulse, the primary storage circuits of block 15 transfer energy to the secondary transfer circuits of block 20 which provide the desired +24 VDC and +5 VDC output voltages. The circuits of block 30 compare the power supply output voltage with a reference voltage and generate an output which adjusts the frequency of the generator circuit of block 24.

Figure 2:
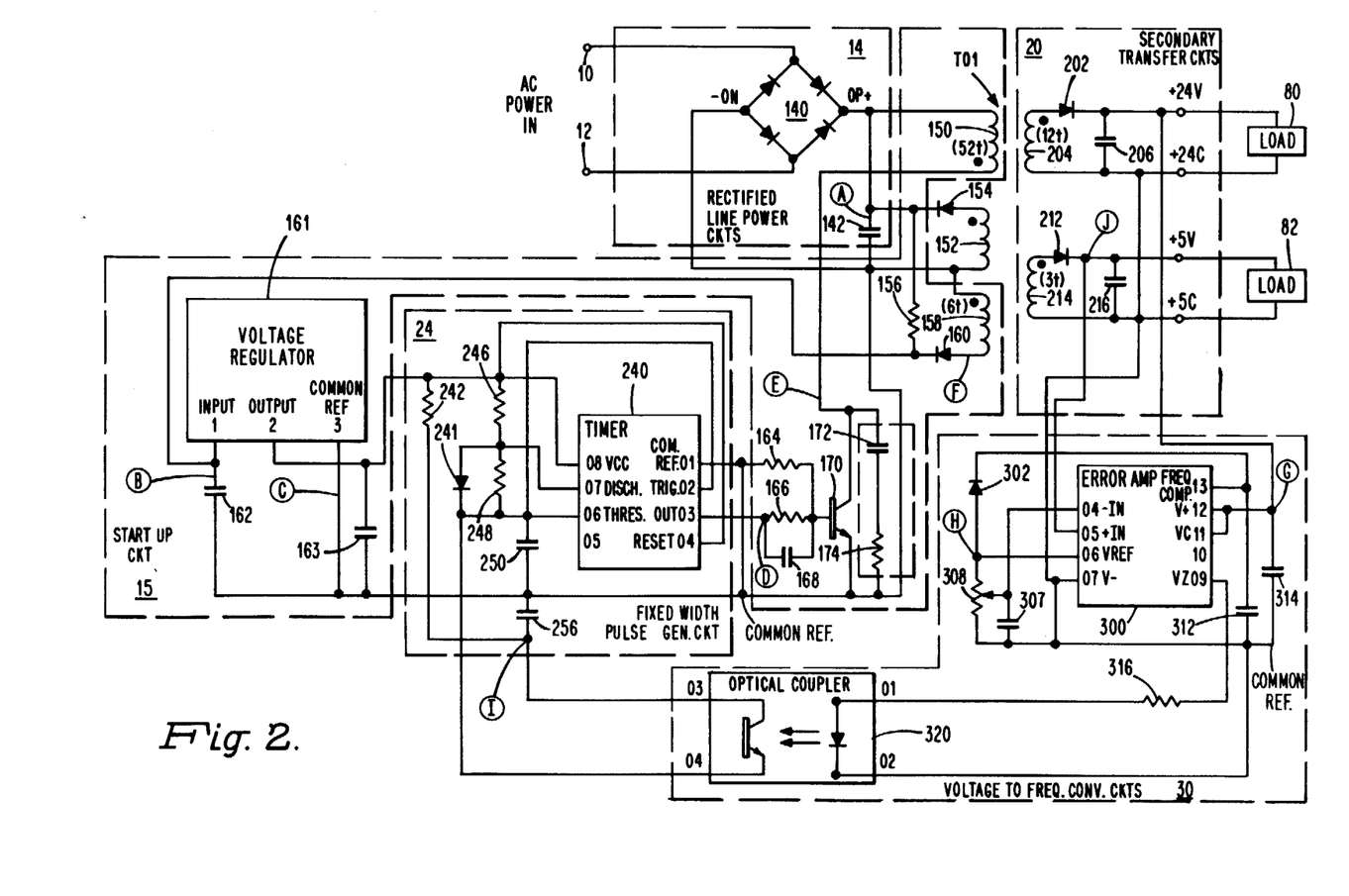
FIG. 2 shows in greater detail the blocks of FIG. 1.

FIG. 2 shows in greater detail, the circuits of each of the blocks of FIG. 1.

Power Circuits 14

As seen from FIG. 2, the power circuits of block 14 include the four rectifier diodes connected as a full wave rectifier bridge 140 and a filter capacitor 142. The rectified AC is applied via positive and negative output terminals OP and ON to filter capacitor 142. The capacitor 142 output voltage is applied to the start-up circuit of block 15.

Start-up Circuit 15

The start-up circuit of block 15 includes primary windings 150 and 158 of a transformer T01, a power switching transistor 170 and its associated resistors and capacitors 164, 166, 168, 172 and 174 which connect as shown and an RC controlled voltage regulator circuit 161 with associated resistors and capacitors 156, 162 and 163. The RC input network to circuit 161 consisting of a resistor 156 and a capacitor 162 connects to a primary feedback winding 158 and series diode 160 and controls the amount of voltage applied to voltage regulator circuit 161. Capacitor 163 serves to filter any noise signals appearing at the output of circuit 162.

The primary windings 150 and 158 are wound with the polarities as shown by the dots. The remaining primary winding 152 with the indicated dot polarity together with series connected diode 154 operates as a snubber network during power supply operation. That is, it cancels out the effect of the voltage spikes or transients caused by load conditions resulting from transformer leakage inductances. Hence, it is not considered as part of the start-up circuit 15. As indicated in FIG. 2, the primary feedback winding 158 has fewer number of turns as compared to winding 150 so as to provide a 52 to 6 turns ratio. This permits the appropriate amount of energy to be fed back to the other circuits within start-up circuit 15 for completing the start-up operation of circuit 240.

The voltage regulator circuit 161 of the preferred embodiment is constructed from an IC voltage regulator having the designation uA7812 described fully in the publication "Voltage Regulator Handbook", published by Fairchild Camera and Instrument Corporation, Copyright 1978. The input starting voltage is applied to input terminal 1 from the output of the RC network formed by resistor 156 and capacitor 162. When the voltage at terminal 1 reaches a value between 4.5–5 V, the circuit 161 produces an output voltage at output terminal 2 sufficient to begin the operation of pulse generator circuit 240.

It will be appreciated that the regulator circuit 161 continues to produce an output voltage which is proportional to the input voltage. When the input voltage reaches the desired output value, here 12 volts, any further change in input voltage causes no change in output voltage. While other circuit arrangements can be utilized to provide a similar mode of operation (e.g. voltage source and zener diode), they require additional power thus reducing power supply efficiency.

Pulse Generator Circuit 24

As seen from FIG. 2, the circuits of block 24 include a fixed pulse width variable frequency generator 240 having an input network which includes resistors 246, 248 and 242, diode 241 and capacitors 250 and 256 connected as shown.

The generator 240 of the preferred embodiment is constructed from an LM555 timer circuit manufactured by major integrated circuit manufacturers. The terminals 2 and 6 are connected together so that circuit 240 when enabled as explained herein can trigger itself and free run as a multivibrator. The voltage generated by voltage regulator circuit 161 is applied to the supply voltage terminal 8 of circuit 240. Terminal 1 connects the internal circuits to the common reference potential at point ON as shown.

Under the control of regulator circuit 161, the supply voltage of circuit 240 is varied between 3.5 volts and 12 volts. Under the control of regulator circuit 161, the capacitor 250 connected between threshold input terminal 6 charges through resistor 246 toward the value of supply voltage and discharges through resistor 248. The diode 241 which connects across resistor 248 is forward biased during its the charging of capacitor 250 and reverse biased during its discharge. The charge time corresponds to the period during which output terminal 3 is high.

The discharge time corresponds to the period during which output terminal 3 is low.

As seen from FIG. 2, the threshold terminal 6 of circuit 240 connects in series with the network which consists of decoupling capacitor 256 and resistor 242. As explained herein, when an optical coupler circuit 320 of block 30 is on, resistor 242 is connected to form a voltage divider with resistor 248 during the discharge time of capacitor 250 (i.e., terminal 7 provides a discharge path to ground or zero volts through a transistor). This hold terminal 7 at a predetermined positive voltage which inhibits circuit 240 from triggering itself. The positive voltage is selected to be approximately 4.5 VDC which is just slightly higher than the triggering voltage of 4 VDC. This enables retriggering to take place within a minimum of delay enabling the power supply to respond immediately to changes in load conditions.

In operation, when sufficient voltage is applied to terminal 8, capacitor 250 begins to charge at which time circuit 240 applies a positive voltage to output terminal 3. When the voltage applied to terminal 6 reaches a predetermined threshold, this causes circuit 240 to switch its output terminal 3 to a low voltage. At this time, circuit 240 enables capacitor 250 to discharge toward zero volts. Upon being discharged to a predetermined voltage, circuit 240 triggers itself.

The positive output pulse from circuit 240 is applied via an input RC network which consists of resistors 164 and 166 and a coupling capacitor 168 to the base of an NPN transistor 170. The emitter terminal of transistor 170 of the start-up circuit connects to the common reference ON. The collector terminal connects through a snubber network consisting of series connected capacitor 172 and resistor 174 which operates to suppress transients.

Secondary Circuits 20

The secondary windings 204 and 214 with the turns indicated (i.e., 12 turns, 3 turns) step down the primary voltages so as to provide the desired +24 VDC and +5 VDC output supply voltages. These windings have polarities which are opposite to that of primary winding 150 which permit energy transfer to the loads to take place only during transformer flyback. Additionally, as explained herein, such loads are disconnected from the secondary circuits while energy is being stored in the primary windings.

The secondary windings 204 and 214 connect to the anodes of diodes 202 and 212 respectively. The cathodes of diodes 202 and 212 connect to output filter capacitors 206 and 216 respectively. As shown, the capacitor 206 connects to a pair of output terminals +24 V and +24 C to which the load represented by block 80 is applied. Similarly, capacitor 216 connects to another pair of output terminals +5 V and 30 5 C to which the load represented by block 82 is applied. These outputs also are applied to the circuits of block 30.

Voltage to Frequency Converter 30

The circuits of block 30 include an error amplifier circuit 300 which is constructed from a standard integrated circuit designated as uA723, manufactured by Fairchild Camera and Instrument Corporation. This circuit is also described in the previously mentioned Fairchild Corporation publication.

As seen from FIG. 2, terminal 4 connects to the output of a variable resistor 308 which connects at one end to a voltage reference (VRef) terminal 6 and at the other end to a secondary common reference potential. The resistor 308 divides down the 7 volt reference voltage applied to (VRef) terminal 6 to a 5 volt value which is applied to (IN) terminal 4. Terminal 7 connects to the secondary common reference voltage potential while (+IN) terminal 5 connects to the positive supply output voltage (+5 V) applied to load 82. The cathode and anode of a diode 302 connect to terminals 6 and 13 respectively. This stabilizes the operation of error amplifier 300 by clamping the internal transistor collector voltage at terminal 13 to the reference voltage on terminal 6. This maintains a constant reference voltage at terminal 13.

Terminal 13 connects to a compensation capacitor 312 and to the cathode of diode 302 whose anode connects to terminal 6. Another V+ terminal 12, connected to a (VC) terminal 11, connects to the positive supply output voltage (+24 V) and to bypass capacitor 314.

The circuit 300 generates an error voltage by comparing the voltage at terminals 4 and 5 relative to the reference voltage applied to terminal 4. The difference voltage is amplified and applied through a zener diode to terminal 9.

The voltage at terminal 9 is applied through a resistor 316 to the input terminal 1 of optical coupler circuit 320. The other input terminal 2 of circuit 320 connects to the common reference voltage of terminal 7. The optical coupler output terminals 3 and 4 connect as shown to capacitor 256 and resistor 242 respectively.

In the preferred embodiment, optical coupler 320 is constructed from a standard integrated circuit designated as H15A1 manufactured by General Electric Corporation. The very high isolation voltage characteristics of the circuit provides the desired DC coupling between error amplifier circuit 300 and generator circuit 240 for controlling the operation thereof. Initially, error amplifier circuit 300 produces no error output thereby placing coupler circuit 320 in an off state. Thus, output terminals 3 and 4 are unconnected (i.e., open). In response to an error voltage, coupler circuit 320 is switched on connecting together output terminals 3 and 4.

As explained herein, the operation of generator circuit 240 is controlled as a function of the error output voltage produced by error circuit 300 by switching coupler circuit 320 on and off.

DESCRIPTION OF OPERATION

Figure 3A:
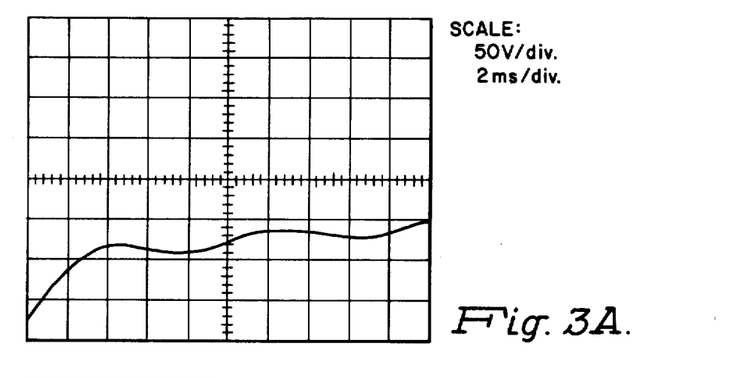
FIGS. 3A through 3J illustrate a series of waveforms used to explain the operation of the present invention.

With reference to FIG. 2 and the waveforms of FIGS. 3A through 3J and 4A through 4C, the operation of the preferred embodiment of the present invention will now be described. When the power supply is turned on, AC power is applied to full wave bridge rectifier 140. The rectified AC voltage appearing at terminals OP and ON approximates 160 volts. This voltage charges input filter capacitor 142 to 160 VDC as shown by the waveform of FIG. 3A.

The voltage across capacitor 142 is used to charge RC network capacitor 162 through resistor 156. As discussed previously, the value of resistor 156 is selected to provide enough current (i.e., approximately 8 milliamperes) to start the generator circuit 24 during normal conditions while at the same time minimizing the amount of power dissipated. This permits the power supply to operate with convection cooling eliminating the need for forced aid cooling by a fan.

Figure 3B:
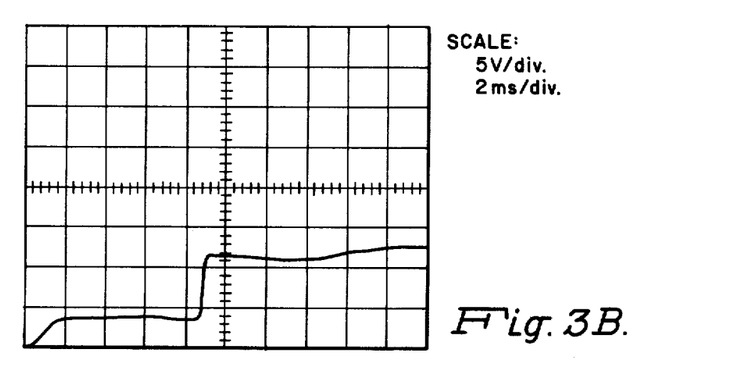

As seen from the waveform of FIG. 3B, the voltage across capacitor 162 begins to rise at the rate shown. The time constant or charging rate established by resistor 156 and capacitor 162 is made short as compared to the time for charging capacitor 142 (i.e., 2 milliseconds and 20 milliseconds as shown in waveforms of FIGS. 3A and 3B). This provides the desired response time for the power supply during start up.

Figure 3C:
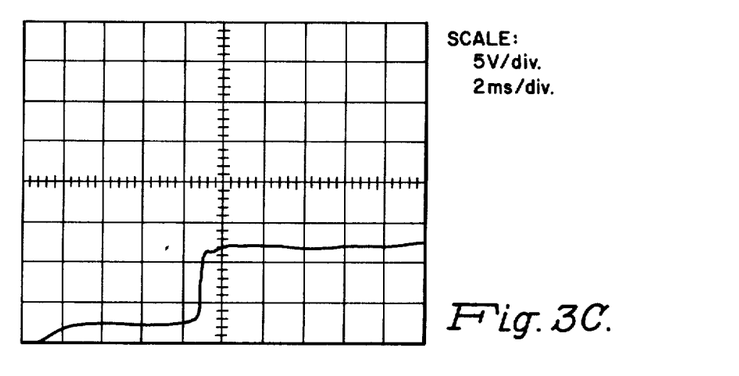

As soon as the voltage of capacitor 162 increases to approximately 5.0 volts, regulator circuit 161 generates a positive going output voltage at terminal 2 as shown in the waveform of FIG. 3C. At this time, as seen from waveform I, the coupler circuit 320 is in an off state. Hence, the time required to charge and discharge capacitor 250 will be established by resistors 246 and 248 respectively.

Figure 3D:
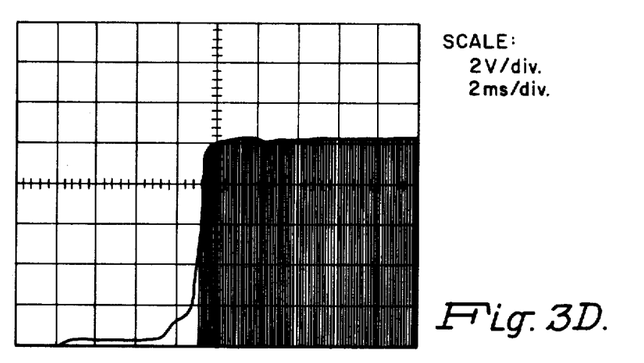

The voltage at terminal 2 is sufficient when applied to the VCC terminal 8 of the pulse generator circuit 240 to cause it to begin generating a positive going output pulse at terminal 3 as shown by the waveform of FIG. 3D.

Figure 3E:
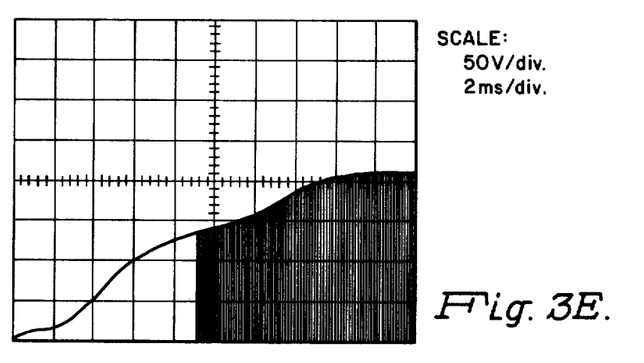
Figure 3F:
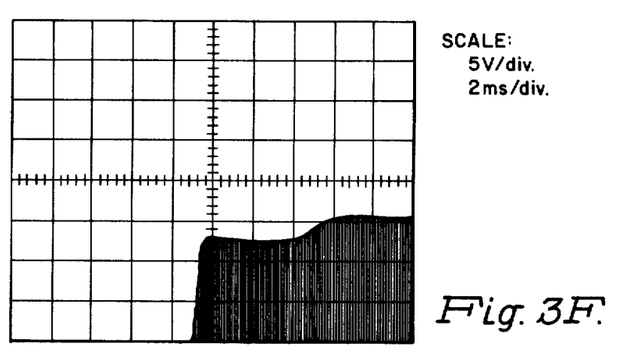

This positive going voltage when applied to the base of transistor 170 via resistor 166 and capacitor 164 is sufficient to switch transistor 170 into saturation since there is no current flowing through primary windings of the transformer. This is illustrated by the waveform of FIG. 3E.

It will be noted that the voltage on filter capacitor 142 is now applied across primary windings 150 of the transformer causing current to flow therethrough. Capacitor 142 begins to discharge through transistor 170. By means of transformer action, a voltage of 18 VDC is induced in step down primary winding 158 as shown in waveform F of FIG. 4. This positive voltage when applied to previously reverse biased diode 160 causes it to conduct and further charge capacitor 162 from a 5 VDC to its normal operating value (15 VDC) as indicated by the second step in the waveform of FIG. 3B.

When regulator circuit 161 receives this normal operating voltage, it operates to clamp or maintain its output voltage to the regulated 12 VDC value. Hence, the 12 VDC is applied as the supply voltage to terminal 8 of the circuit 240 causing it start normal operation wherein it produces pulses having a pulse width of 6 microseconds. This takes place after the first cycle of operation. As seen from the waveform of FIG. 3D, initially generator circuit 24 runs at maximum frequency producing the series of six microseconds width pulses shown in greater detail in FIG. 4C since the output capacitors 206 and 216 and loads have not been brought up to normal operating conditions. That is, until the +24 VDC and 5 VDC output voltages reach their desired values, no error voltage is generated by circuit 300 as explained herein for altering the frequency of circuit 240.

Briefly, summarizing the above, it is seen that the start-up circuit 150 applies sufficient supply operating voltage to generator circuit 24 causing it to generate an output voltage. This voltage saturates transistor 170 which causes the start-up circuit 150 to produce further current so as to increase the supply voltage to the value required for normal operation of the pulse generator circuit 240.

Figure 3G:
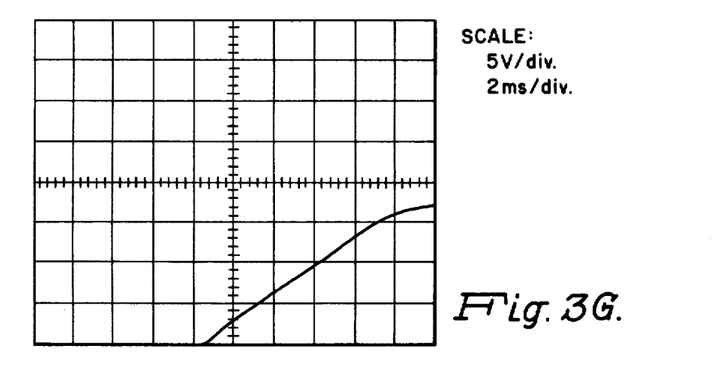
Figure 3H:
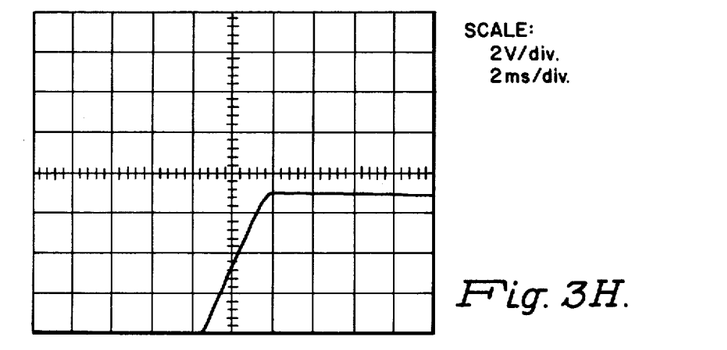
Figure 3I:
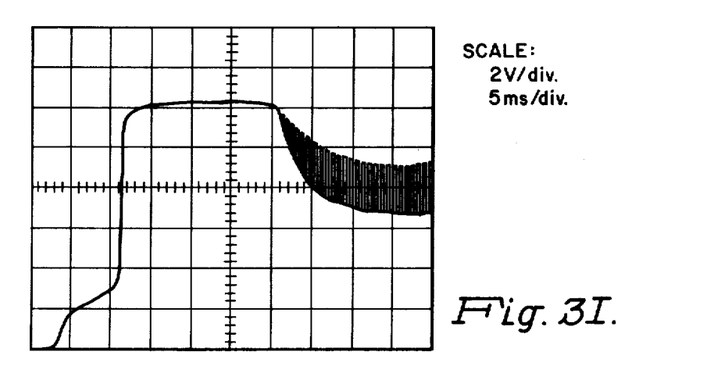
Figure 3J:
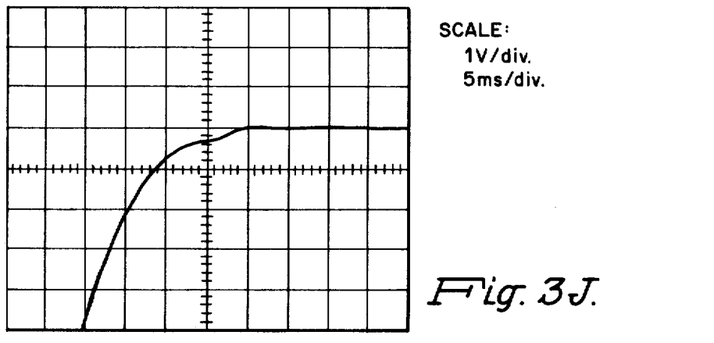

At the end of the first cycle of operation defined by the fixed pulse width output of circuit 240, transistor 170 switches off. This interrupts the current flow through primary winding 150 causing a reverse emf or back voltage to be generated in winding 158 by the magnetic field produced in the opposite direction. Also, this induces voltages of the polarity required for forward biasing diodes 202 and 212. The result is that output filter capacitors 206 and 216 begin charging as shown by the waveforms of FIGS. 3G and 3J. After a number of cycles of operation of circuit 240 at maximum frequency, the +5 VDC output supply voltage shown in the waveform of FIG. 3J increases above the 5 VDC reference voltage applied to terminal 4. At this time, error amplifier circuit 300 operates to generate an output error voltage at terminal 9. This voltage switches on coupler circuit 320 as shown by the waveform of FIG. 3I. At this time, resistor 242 is connected to the cathode of diode 241 holding the voltage that point at slightly above the threshold point at which generator circuit 240 triggers (i.e., 4.5 VDC). Thus, circuit 240 is inhibited from generating further fixed width output pulses. This, in turn, prevents further energy from being stored and transferred to the secondary circuits and loads.

As soon as the error amplifier circuit 300 detects that the +5 output supply voltage is at the desired operating value, it switches off coupler circuit 320. This permits capacitor 250 to immediately discharge to the desired threshold voltage for triggering generator circuit 240. As previously mentioned, holding the threshold voltage just slightly above the triggering threshold, permits the power supply to respond to changes in line and load conditions within a minimum amount of time (i.e., within less than one microsecond).

From the above, it is seen how the start-up circuit of the power supply of the preferred embodiment causes generator circuit 24 to produce fixed width output pulses. Thereafter, the error amplifier circuit 300 operates to generate an output error signal for adjusting the frequency of generator circuit 240 in accordance with line and load conditions. In this manner, only the required amount of energy will be delivered to the output loads.

Figure 4A:
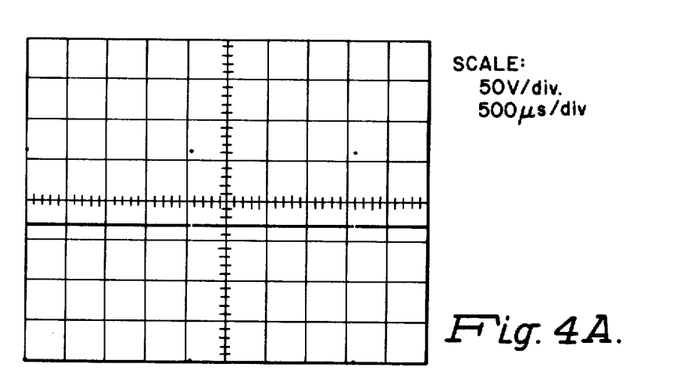
FIGS. 4A through 4C illustrate the operation of the power supply at various load conditions.
Figure 4B:
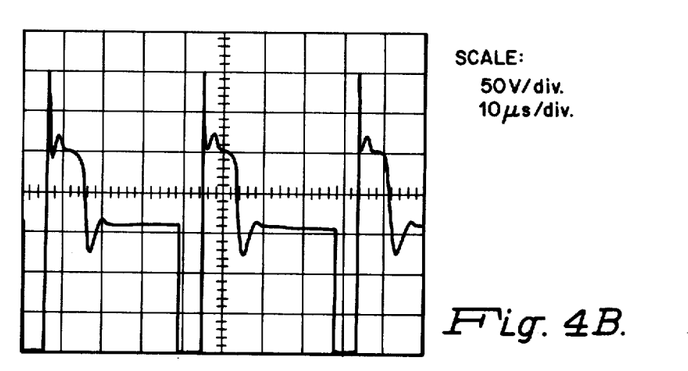
Figure 4C:
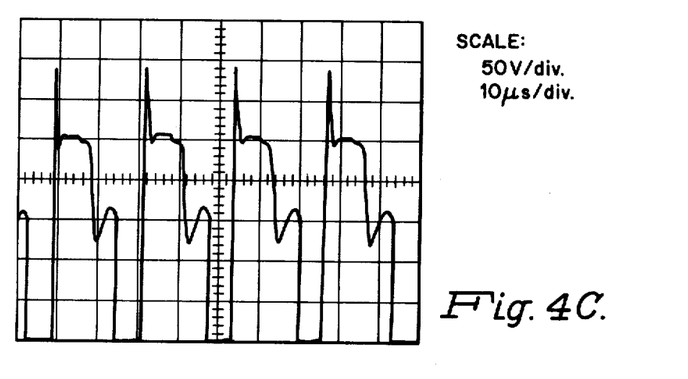

The changes in operating frequency as a function of load conditions are illustrated by the waveforms of FIGS. 4A through 4C. In the case of no load operation (i.e., minimum power), the error amplifier circuit 300 holds coupler circuit 320 on for long periods of time. Thus, during the no load condition, pulse generator circuit 240 operates at a minimum frequency which approximates 490 hertz.

As seen from FIGS. 4B and 4C, during half load and full load conditions, pulse generator circuit 240 operates at frequencies of 25 kilohertz and 45 kilohertz respectively. Thus, the arrangement of the preferred embodiment by only increasing the frequency of pulse generator circuit 240 in response to increases in load power requirements, power consumption and dissipation can be held to a minimum.

By way of illustration, the component values selected for the preferred embodiment of the present invention are as listed in the table below.

TABLE

| | |
|---|---|
| capacitor 142 | 220 microfarads |
| resistor 156 | 20 kilohms |
| capacitor 162 | .1 microfarads |
| capacitor 163 | 1 microfarad |
| resistor 164 | 47 ohms |
| resistor 166 | 220 ohms |

TABLE-continued

| | |
|---|---|
| capacitor 168 | .0068 microfarads |
| capacitor 172 | 680 microfarads |
| resistor 174 | 1.8 kilohms |
| capacitors 206 & 216 | 1.1K microfarads |
| resistor 242 | 16 kilohms |
| resistor 246 | 4.3 kilohms |
| resistor 248 | 10 kilohms |
| capacitor 250 | .0015 microfarads |
| capacitor 256 | 160 microfarads |
| capacitor 307 | 1 microfarad |
| resistor 308 | 5 kilohms |
| capacitor 312 | 24 picofarads |
| capacitor 314 | 1 microfarad |
| resistor 316 | 1.0 kilohms |

In summary, the invention provides a novel self starting power supply which frequency controls the amount of energy stored and transferred as a function of line and load conditions. This arrangement of the invention reduces the complexity of the power supply to a minimum while facilitating its construction from standard integrated circuits.

While in accordance with the provisions and statutes there has been illustrated and described the best form of the invention, certain changes may be made without departing from the spirit of the invention as set forth in the appended claims and that in some cases, certain features of the invention may be used to advantage without a corresponding use of other features.

What is claimed is:

1. A switching regulator power supply connected to a DC source of rectified AC voltage and having a regulation cycle of operation consisting of an energy storage cycle and an energy transfer cycle, said supply comprising:

pulse generator circuit means having a supply voltage input terminal and an output terminal, said circuit means generating pulses having a predetermined fixed pulse width at a variable frequency rate;

start-up circuit means connected to said DC source and to said pulse generator circuit means, said start-up circuit means including:

power switching transistor circuit means connected to one end of said DC source and to said output terminal of said pulse generator circuit, said transistor circuit means providing current during said energy storage cycle in response to said pulses;

transformer means having a primary winding with one end connected to the other end of said DC source and the other end connected to said power transistor circuit means to permit current flow in a first direction during said energy storage cycle and in the other direction during said energy transfer cycle, and a feedback primary winding having one end connected to said other end of said DC source and the other end, said feedback primary winding being AC coupled to said primary winding so as to provide a predetermined voltage during a first energy storage cycle; and, RC controlled voltage regulator circuit means being connected to said one end of said DC source, to said other end of said second primary winding and to said input voltage terminal of said pulse generator circuit means, said RC controlled means, said RC controlled voltage regulator circuit means in response to said rectified AC voltage being operative to apply sufficient supply voltage to said input supply voltage terminal, for causing said generator circuit means to provide an output voltage, said power transistor circuit means in response to said output voltage producing said current flow in said first direction through said first primary winding and said feedback winding in response to said current flow applying said predetermined voltage to said RC controlled voltage regulator circuit means causing said regulator circuit means to increase said output voltage applied to said voltage supply input terminal to a normal operating value within a predetermined period of time, said pulse generator circuit means in response to said value being conditioned to generate pulses having said predetermined pulse width and at a maximum rate of frequency for maximizing the storage and transfer of energy during initial operation.

2. The power supply of claim 1 wherein said pulse generator circuit further including a trigger input terminal and wherein said transformer means further includes:

a number of secondary windings connected to provide different output supply voltages, each secondary winding having a unidirectional current conducting device connected so as to prevent current flow during said energy storage cycle and to enable current flow during said energy transfer cycle and wherein said supply further includes:

error amplifier circuit means having input and output terminals, said input terminal connected to at least one of said number of secondary windings, said error amplifier circuit means generating an error voltage at said output terminal in response to changes in one of said predetermined supply voltages; and, DC coupling switching means having an input circuit and an output circuit, said input circuit being connected to said output terminal and said output circuit being connected to said pulse generator circuit means trigger input terminal, said DC coupling switching means being switched on and off in accordance with said error voltage for inhibiting and enabling respectively the triggering of said pulse generator circuit means for varying said pulse generator frequency in accordance with said changes in said one supply voltage.

3. The power supply of claim 1 wherein said RC controlled voltage means includes RC network means having an input and an output, said input being connected to said DC source and said output being connected to said feedback primary winding, said RC network means having a time constant selected for minimizing the amount of energy required for starting up said pulse generator circuit means within a minimum period of time.

4. The power supply of claim 3 wherein said RC network means consists of a resistor connected in series with a capacitor, one of said resistor being connected to said input and one end of said capacitor being connected to said output and to said feedback primary winding and the other end being connected to a common reference potential, said capacitor being charged to a predetermined input voltage through said resistor in response to said AC rectified voltage from said DC source and said voltage applied by said feedback primary winding.

5. The power supply of claim 4 wherein said DC source includes full wave rectifier means and capacitor means connects to said rectifier means for storing said rectified AC voltage, and wherein said resistor and capacitor are selected to have values which make the time for charging said capacitor to said predetermined input voltage is much shorter than the time required for charging said capacitor means to said rectified AC voltage.

6. The power supply of claim 5 wherein said time for charging said capacitor means to said rectified AC voltage approximates 20 milliseconds and said time for charging said capacitor to said predetermined input voltage approximates 2 milliseconds.

7. The power supply of claim 6 wherein said primary winding and feedback primary winding have a predetermined turns ratio for stepping down the voltage developed across said primary winding by at least a factor of eight.

8. The power supply of claim 4 wherein said RC controlled voltage regulator circuit means further includes a voltage regulator circuit having an input terminal and an output terminal, said input terminal being connected to said capacitor of said RC network means and said output terminal being connected to said pulse generator circuit means, said voltage regulator circuit means being operative to increase said output voltage and maintain said output voltage at said normal operating when said capacitor charges within said minimum period of time to said predetermined voltage.

9. The power supply of claim 8 wherein said pulse generator circuit means includes:

a multivibrator circuit having a voltage supply input terminal, a trigger input terminal and a threshold input terminal, said voltage supply input terminal being connected to said regulator circuit output terminal and said trigger and threshold input terminals being connected in common for operating said multivibrator circuit in an astable mode, said multivibrator circuit generating said pulses having said predetermined pulse width when said voltage regulator circuit applies said normal operating voltage to said voltage supply input terminal.

10. The power supply of claim 9 wherein said multivibrator circuit further includes a discharge input terminal and wherein said pulse generator circuit means further includes:

an RC network consisting of a first resistor having one end connected to said output terminal of said voltage regulator circuit and the other end of said first resistor connected to said discharge input terminal, a second resistor having one end connected to said discharge input terminal and the other end connected to said threshold input terminal and a capacitor having one end connected to said threshold input terminal and the other end to a common reference voltage; and, a diode having anode and cathode terminals, said anode terminal being connected to said discharge input terminal and said cathode terminal being connected to said threshold input terminal, said diode being forward biased during a first time interval during which said capacitor is being charged through said first resistor to a first predetermined threshold voltage for switching the state of said multivibrator and said diode being reverse biased during a second time interval during which said capacitor discharges through said second resistor and discharge input terminal to a second predetermined threshold voltage for triggering said multivibrator, said first time interval corresponding to said predetermined pulse width.

11. The power supply of claim 2 wherein said error amplifier means includes:

an amplifier circuit having an input terminal connected to one of said secondary windings for monitoring a corresponding one of said power supply voltages, a voltage reference terminal, an inverting input terminal and an output terminal connected to said DC coupling switching means; and, a voltage reference circuit having a plurality of terminals, a first terminal being connected to said voltage reference terminal, a second terminal being connected to a common reference voltage and a third terminal being connected to said inverting input terminal, said amplifier circuit being operative to generate said error voltage proportional to the difference between said output power supply voltage and the voltage applied to said inverting input terminal by said voltage reference circuit.

12. The power supply of claim 2 wherein said pulse generator circuit means further includes a multivibrator circuit having a trigger input terminal and a threshold input terminal connected in common for operating said multivibrator circuit in an astable mode and voltage means connected to said RC controlled voltage regulator circuit means and to said DC coupling switching means, said DC coupling switching means being operative in accordance with said error voltage to inhibit the triggering of said multivibrator so as to vary said frequency.

13. The power supply of claim 12 wherein said multivibrator circuit includes a discharge input terminal and wherein said pulse means further includes:

an RC network consisting of a first resistor having one end connected to said output terminal of said RC controlled voltage means and the other end connected to said discharge input terminal, a second resistor connected at one end to said discharge input terminal and the other end to said threshold input terminal and a capacitor having one end connected to said threshold input terminal and the other end to a common reference voltage;

a diode having anode and cathode terminals, said anode terminal connected to said discharge input terminal and said cathode terminal connected to said threshold input terminal; and a third resistor connected at one end to said output terminal of said voltage regulator circuit and the other end of said DC coupling means, said diode being forward biased during a first time interval during which said capacitor is charged to a first predetermined voltage for switching said multivibrator to a first state and said diode being reversed biased during a second time interval during which said capacitor discharges through said discharge input terminal to a second predetermined threshold voltage in the absence of said DC coupling means applying a voltage through said third resistor to said threshold input terminal for triggering said multivibrator to switch from said first to second state.

14. The power supply of claim 13 wherein said DC coupler switching means includes an optical coupler device having a light emitting diode input circuit connected to said error amplifier circuit and a light responsive transistor output circuit connected to said third resistor and to said threshold input terminal, said diode input circuit being operative in response to said error voltage to switch on said transistor output circuit connecting said third resistor to said threshold input terminal for applying a voltage to said threshold input terminal to hold said threshold input terminal above said second predetermined threshold voltage inhibiting said multivibrator from switching to said second state.

15. A switching regulator power supply connected to a DC source of rectified AC voltage and having a regulation cycle of operation consisting of an energy storage cycle and an energy transfer cycle, said supply comprising:
- a multivibrator generator circuit having a supply voltage input terminal and an output terminal, said generator circuit generating pulses having a predetermined fixed pulse width at an adjustable frequency rate;
- a start-up circuit for starting the operation of said generator circuit, said circuit being connected to said DC source and to said generator circuit, said start-up circuit including:
  - a power switching transistor circuit connected to one end of said DC source and to said generator circuit output terminal, said transistor circuit providing current during said energy storage cycle in response to a corresponding one of said pulses;
  - a transformer including:
    - a primary winding with one end connected to the other end of said DC source and the other end connected to said power transistor circuit to permit current flow in a first direction during said energy storage cycle and in the other direction during said energy transfer cycle; and,
    - a feedback primary winding having one end connected to said other end of said DC source and the other end in series with a unidirectional element, said feedback winding having substantially less turns than said primary winding and AC coupled therewith so as to permit current flow through said unidirectional element in said second direction during a first energy storage cycle;
  - a series resistor and capacitor network, one end of said resistor connected to said one end of said DC source and the other end of said resistor connected to said unidirectional element and a junction of said resistor and capacitor being connected to an output terminal and the other end of said capacitor being connected to said other end of said DC source; and,
  - a voltage regulator circuit having input and output terminals, said input terminal connected to said output terminal and said output terminal being connected to said supply voltage input terminal, said voltage regulator circuit being conditioned when said capacitor initially charges proportionally to said AC rectified voltage to generate a first output voltage on said supply voltage input terminal sufficient to cause said multivibrator generator circuit to start generating a first pulse, said power transistor circuit being switched on causing current to flow through said primary winding in said first direction and said feedback primary winding in response to said current flow producing current flow through said unidirectional element in said second direction charging said capacitor to a predetermined voltage within the normal operating range of said regulator circuit within a predetermined time period and said regulator circuit in response to said voltage increasing said first output voltage on said supply voltage for completing the start-up of said multivibrator generator circuit wherein said multivibrator generates pulses having said predetermined pulse width.

16. The power supply of claim 15 wherein said DC source includes full wave rectifier means and capacitor means connects to said rectifier means for storing said rectified AC voltage, and
wherein said resistor and capacitor of said network are selected to have the values which make the time for charging said capacitor to said predetermined voltage is much shorter than the time required for charging said capacitor means to said rectified AC voltage.

17. The power supply of claim 16 wherein said time for charging said capacitor means to said rectified AC voltage approximates 20 milliseconds and said time for charging said capacitor to said predetermined voltage approximates 2 milliseconds.

18. The power supply of claim 15 wherein said multivibrator generator circuit further includes a discharge input terminal and wherein said multivibrator generator circuit further includes:
- an RC network consisting of a first resistor having one end connected to said output terminal of said voltage regulator circuit and the other end of said first resistor connected to said discharge input terminal, a second resistor having one end connected to said discharge input terminal and the other end connected to said threshold input terminal and a capacitor having one end connected to said threshold input terminal and the other end to a common reference voltage; and,
- a diode having anode and cathode terminals, said anode terminal being connected to said discharge input terminal and said cathode terminal being connected to said threshold input terminal, said diode being forward biased during a first time interval during which said capacitor is being charged through said first resistor to a first predetermined threshold voltage for switching the state of said multivibrator and said diode being reverse biased during a second time interval during which said capacitor discharges through said second resistor and discharge input terminal to a second predetermined threshold voltage for triggering said multivibrator, said first time interval corresponding to said predetermined pulse width.

19. The power supply of claim 15 wherein said supply further includes:
secondary circuit means for providing a desired output voltage to a load, said secondary circuit means being AC coupled to said primary winding so as to permit current flow in a second predetermined direction opposite to said first predetermined direction during said energy transfer cycle for transferring energy to said load; and, voltage frequency conversion means, said conversion means being connected to said secondary circuit means and to said multivibrator generator circuit, said frequency conversion means being operative to vary the frequency of said multivibrator circuit for controlling the transfer of energy in accordance with changes in said load in a manner which minimizes power consumption.

20. The power supply of claim 19 wherein said voltage frequency conversion means includes:
   error amplifier means connected to said secondary circuit means, said error amplifier means generating an error voltage indicative of the change in load energy requirements; and,
   DC coupling means connected to said error amplifier means and to said pulse circuit generating means, said DC coupling means being operative in response to said error voltage to vary said frequency of said multivibrator circuit for controlling said energy transfer.

21. The power supply of claim 19 wherein said secondary circuit means includes a plurality of secondary windings, each secondary winding having a unidirectional current conducting device connected in series with said secondary winding so as to inhibit current flow to said load during said energy storage cycle and to enable current flow to said load during said energy transfer cycle.

22. The power supply of claim 20 wherein said error amplifier means includes:
   an amplifier circuit having an input terminal connected to said secondary circuit means for monitoring the output power supply voltage, a voltage reference terminal, an inverting input terminal and an output terminal connected to said DC coupling means; and,
   a voltage reference circuit having a plurality of terminals, a first terminal being connected to said voltage reference terminal, a second terminal being connected to a common reference voltage and a third terminal being connected to said inverting input terminal, said amplifier circuit being operative to generate said error voltage proportional to the difference between said output power supply voltage and the voltage applied to said inverting input terminal by said voltage reference circuit.

23. The power supply of claim 20 wherein said multivibrator circuit further includes a trigger input terminal and a threshold input terminal connected in common for operating said multivibrator circuit in an astable mode and voltage means connected to said RC controlled voltage means and to said DC coupling means, said DC coupling means being operative in accordance with said error voltage to inhibit the triggering of said multivibrator circuit so as to vary said frequency.

24. The power supply of claim 23 wherein said multivibrator circuit further includes:
   a discharge input terminal;
   an RC network consisting of a first resistor having one end connected to said output terminal of said RC controlled voltage means and the other end connected to said discharge input terminal, a second resistor connected at one end to said discharge input terminal and the other end to said threshold input terminal and a capacitor having one end connected to said threshold input terminal and the other end to a common reference voltage;
   a diode having anode and cathode terminals, said anode terminal connected to said discharge input terminal and said cathode terminal connected to said threshold and said cathode terminal connected to said threshold input terminal; and
   a third resistor connected at one end to said output terminal of said voltage regulator circuit and the other end of said DC coupling means, said diode being forward biased during a first time interval during which said capacitor is charged to a first predetermined voltage for switching said multivibrator to a first state and said diode being reverse biased during a second time interval during which said capacitor discharges through said discharge input terminal to a second predetermined threshold voltage in the absence of said DC coupling means applying a voltage through said third resistor to said threshold input terminal for triggering said multivibrator to switch from said first to second state.

25. The power supply of claim 24 wherein said DC coupler means includes an optical coupler device having a light emitting diode input circuit connected to said error amplifier circuit and a light responsive transistor output circuit connected to said third resistor and to said threshold input terminal, said diode input circuit being operative in response to said error voltage to switch on said transistor output circuit connecting said third resistor to said threshold input terminal for applying a voltage to said threshold input terminal to hold said threshold input terminal above said second predetermined threshold voltage inhibiting said multivibrator from switching to said second state.

26. A switching regulator power supply connected to a DC source of rectified AC voltage and having a regulation cycle of operation including an energy storage cycle, said supply comprising:
   pulse generator circuit means for generating pulses having a predetermined fixed pulse width defining the duration of said storage cycle; and,
   start-up circuit means connected to said DC source and to said pulse generator circuit means, said start-up circuit means including:
   primary transformer winding means connected to said DC source;
   feedback circuit means AC coupled to said primary transformer winding means;
   RC controlled voltage means connected to said DC source, to said primary transformer means, to said feedback circuit means and to said pulse generation means, said RC controlled voltage means including:
      an RC network means consisting of a resistor connected in series with a capacitor, said resistor being connected to said DC source and one end of said capacitor being connected to said feedback circuit means and the other end being connected to a common reference potential; and
      a voltage regulator circuit having an input terminal and an output terminal, said input terminal being connected to said capacitor and said output terminal being connected to said pulse generator circuit means, said RC network means in response to said rectified AC voltage conditioning said voltage regulator circuit to apply an output voltage to said pulse generator circuit means to begin operation by generating an output voltage, said output voltage enabling current to flow through said primary transformer means causing said feedback circuit means to generate and apply a feedback voltage to said RC network means for charging said capacitor to a predetermined input voltage, said voltage regulator circuit being conditioned by said RC network means to increase said output voltage to a predetermined value after a predetermined period of time and maintain said output voltage at said predetermined value causing said pulse generator circuit means to operate normally and generate said pulses having said predetermined pulse width.

27. The power supply of claim 26 wherein said start-up circuit means further includes power switching transistor means connected to said pulse generator circuit means and to said primary transformer means, said power switching transistor means in response to said output voltage being operative to connect said primary transformer means to a common reference voltage in parallel with said DC source causing said current to flow in a first predetermined direction therethrough.

28. The power supply of claim 26 wherein said DC source includes full wave rectifier means and capacitor means connects to said rectifier means for storing said rectified AC voltage, and
   wherein said resistor and capacitor are selected to have values which make the time for charging said capacitor to said predetermined input voltage is much shorter than the time required for charging said capacitor means to said rectified AC voltage.

29. The power supply of claim 28 wherein said time for charging said capacitor means to said rectified AC voltage approximates 20 milliseconds and said time for charging said capacitor to said predetermined input voltage approximates 2 milliseconds.

30. The power supply of claim 1 wherein said predetermined portion of said predetermined number of turns steps down the voltage developed across said primary winding by at least a factor of eight.

31. The power supply of claim 21 wherein said primary transformer means includes a primary winding having a predetermined number of turns and wherein said feedback circuit means includes a transformer winding closely coupled to said primary winding, one end of said winding being connected to said resistor and the other end being connected to said DC source, said transformer winding having a predetermined portion of said predetermined number of turns so as to generate said predetermined input voltage as a function of said rectified AC voltage.

32. The power supply of claim 26 wherein said pulse generator circuit means includes:
   a multivibrator circuit having a voltage supply input terminal, a trigger input terminal and a threshold input terminal, said voltage supply input terminal being connected to said regulator circuit output terminal and said trigger and threshold input terminals being connected in common for operating said multivibrator circuits in an astable mode, said multivibrator circuit generating said pulses having said predetermined pulse width when said voltage regulator circuit applies said predetermined input voltage to said voltage supply input terminal.

33. The power supply of claim 32 wherein said multivibrator circuit further includes a discharge input terminal and wherein said pulse generator circuit means further includes:
   an RC network consisting of a first resistor having one end connected to said output terminal of said voltage regulator circuit and the other end of said first resistor connected to said discharge input terminal, a second resistor having one end connected to said discharge input terminal and the other end connected to said threshold input terminal and a capacitor having one end connected to said threshold input terminal and the other end to a common reference voltage; and,
   a diode having anode and cathode terminals, said anode terminal beind connected to said discharge input terminal and said cathode terminal being connected to said threshold input terminal, said diode beind forward biased during a first time interval during which said capacitor is being charged through said first resistor to a first predetermined threshold voltage for switching the state of said multivibrator and said diode being reverse biased during a second time interval during which said capacitor discharges through said second resistor and discharge input terminal to a second predetermined threshold voltage for triggering said multivibrator, said first time interval corresponding to said predetermined pulse width.

34. A switching regulator power supply connected to a DC source of rectified AC voltage and having a regulation cycle of operation including an energy storage cycle, said supply comprising:
   pulse generator circuit means for generating pulses having a predetermined fixed pulse width at a variable frequency rate, said predetermined fixed pulse width defining the duration of said storage cycle, said pulse generator circuit means including a multivibrator circuit having a trigger input terminal and a threshold input terminal connected in common for operating said multivibrator circuit in an astable mode and voltage means;
   start-up circuit means connected to said DC source and to said pulse generator circuit means, said start-up circuit means including:
   primary transformer winding means connected to said DC source, and
   RC controlled voltage means connected to said DC source, to said primary transformer means and to said pulse generator circuit voltage means, said RC controlled voltage means in response to said rectified AC voltage being operative to apply an output voltage to said pulse generator circuit means sufficient to cause said pulse generator circuit means to begin operation by generating an output voltage, said output voltage enabling current to flow through said primary transformer means for generating a feedback voltage for application to said RC controlled voltage means, said voltage means increasing said output voltage to a predetermined value after a predetermined period of time causing said pulse generator circuit to operate normally and generate said pulses having said predetermined pulse width;
   secondary circuit means for providing a desired output voltage to a load, said secondary circuit means being AC coupled to said primary transformer winding means so as to permit current flow in a second predetermined direction opposite to said first predetermined direction during said energy transfer cycle for transferring energy to said load; and, voltage frequency conversion means, said conversion means including:

error amplifier means connected to said secondary circuit means, said error amplifier means generating an error voltage indicative of the change in load energy requirements; and, DC coupling means connected to said error amplifier means and to said voltage means, said DC coupling means being operative in response to said error voltage to inhibit the triggering of said multivibrator so as to vary said frequency for controlling said energy transfer according to said change in load energy requirements.

35. The power supply of claim 34 wherein said secondary circuit means includes a plurality of secondary windings, each secondary winding having a unidirectional current conducting device connected in series with said secondary winding so as to inhibit current flow to said load during said energy storage cycle and to enable current flow to said load during said energy transfer cycle.

36. The power supply of claim 34 wherein said error amplifier means includes:

an amplifier circuit having an input terminal connected to said secondary circuit means for monitoring the output power supply voltage, a voltage reference terminal, an inverting input terminal and an output terminal connected to said DC coupling means; and, a voltage reference circuit having a plurality of terminals, a first terminal being connected to said voltage reference terminal, a second terminal being connected to a common reference voltage and a third terminal being connected to said inverting input terminal, said amplifier circuit being operative to generate said error voltage proportional to the difference between said output power supply voltage and the voltage applied to said inverting input terminal by said voltage reference circuit.

37. The power supply of claim 34 wherein said multivibrator circuit includes a discharge input terminal and wherein said pulse means further includes:

an RC network consisting of a first resistor having one end connected to said output terminal of said RC controlled voltage means and the other end connected to said discharge input terminal, a second resistor connected at one end to said discharge input terminal and the other end to said threshold input terminal and a capacitor having one end connected to said threshold input terminal and the other end to a common reference voltage;

a diode having anode and cathode terminals, said anode terminal connected to said discharge input terminal and said cathode terminal connected to said threshold input terminal; and a third resistor connected at one end to said output terminal of said voltage regulator circuit and the other end of said DC coupling means, said diode being forward biased during a first time interval during which said capacitor is charged to a first predetermined voltage for switching said multivibrator to a first state and said diode being reverse biased during a second time interval during which said capacitor discharges through said discharge input terminal to a second predetermined threshold voltage in the absence of said DC coupling means applying a voltage through said third resistor to said threshold input terminal for triggering said multivibrator to switch from said first to second state.

38. The power supply of claim 37 wherein said DC coupler means includes an optical coupler device having a light emitting diode input circuit connected to said error amplifier circuit and a light responsive transistor output circuit connected to said third resistor and to said threshold input terminal, said diode input circuit being operative in response to said error voltage to switch on said transistor output circuit connecting said third resistor to said threshold input terminal for applying a voltage to said threshold input terminal to hold said threshold input terminal above said second predetermined threshold voltage inhibiting said multivibrator from switching to said second state.

* * * * *